United States Patent Office 3,584,096
Patented June 8, 1971

3,584,096
METHOD OF MAKING SYNTHETIC SUEDE-LIKE PLASTIC FILMS
Sarkis M. Kassouni and Arthur S. Nicholas, Grand Rapids, Mich., assignors to Vinyl Industrial Products Inc., Grand Rapids, Mich.
No Drawing. Filed Mar. 22, 1968, Ser. No. 715,422
Int. Cl. D04h 1/20
U.S. Cl. 264—112                                     8 Claims

ABSTRACT OF THE DISCLOSURE

A method of making suede-like surfaces from synthetic thermoplastic material such as polyvinyl chloride. These surfaces are formed from thermoplastic particles of a size below about 500 microns, preferably below about 100 microns, and are fused into a continuous layer of the synthetic polymer below the surface.

The surfaces are made by heating a liquid plastisol having a dispersed mixture of a predominant amount of relatively large particles with a minor amount of relatively small particles on a forming surface at a temperature and for a time sufficient to fuse the small particles into a continuous layer and to fuse the outer surface of the relatively large particles only to the continuous layer.

---

The invention relates to a method for forming a non-reflective suede-like finish film from a synthetic thermoplastic polymer by heating a liquid plastisol having a dispersed mixture of a predominant amount of relatively large thermoplastic polymer particles and a minor amount of relatively small thermoplastic polymer particles on a forming surface, the amount of plasticizer, the temperature of heating, and the time of heating being sufficient to fuse into a continuous layer the relatively small thermoplastic polymer particles and to fuse only portions of the relatively large particles in the continuous layer, leaving the relatively large particles substantially in particle form and protruding out of the continuous layer to form the non-reflective suede-like finish.

Vinyl surface coatings have found widespread acceptance in the auto industry for interior parts such as dashboards, headliners, upholstery, and rearview mirrors. One problem with vinyl surfaces is that they tend to be relatively smooth and reflect sunlight, thereby creating a safety hazard. Heretofore, only articles with glossy surfaces, or at best low glass surfaces, have been made.

We have now discovered a synthetic non-reflective or suede-like finish for article surfaces, which finish is formed from a plastisol having dispersed therein a predominant amount of relatively large thermoplastic particles forming the surface and fused into a continuous layer beneath the surface. The film containing the finish is formed by a simple process in which the relatively large and relatively small particles in a plasticizer are heated on a forming surface to a temperature and for a time sufficient to fuse the smaller particles into a continuous layer and sufficient to fuse only portions of the larger particles into the continuous layer. The amount of plasticizer used is insufficient to form a continuous, smooth film with the larger particles.

It is an object of this invention to provide a process for making a film with a non-reflective suede-like surface from a synthetic thermoplastic material.

Other aspects, objects, and the several advantages of this invention are apparent to one skilled in the art from a study of this disclosure, the drawings, and the appended claims.

According to the invention, there is provided a method for making a film having a suede-like surface formed from a plurality of synthetic thermoplastic particles which are substantially separate from each other so as to form cavities between each particle on the surface. The particles are fused together beneath the surface by a continuous layer of the synthetic thermoplastic material.

The thermoplastic particles forming the surface of the film, generally are less than 500 microns and preferably will have a size in the range of 10 to 100 microns.

The synthetic thermoplastic material, which forms the surface, can be any synthetic thermoplastic material which can be made into different size particles, is dispersible in a liquid plasticizer, and which is at least partially fusable when heated to a high temperature. Examples of such materials are cellulose acetate, cellulose acetate butyrate, cellulose nitrate, ethyl cellulose, poly methyl methacrylate, polystyrene, polyvinyl acetate, polyvinyl chloride, polyvinyl butyral, polyvinyl chloride acetate, and acrylonitrile-butadiene-styrene terpolymers. In a preferred embodiment of the invention, these films are formed from a polyvinyl chloride plastisol.

Further according to the invention, a synthetic film having a suede-like, no gloss surface is formed by heating a plastisol having dispersed therein a mixture of a predominant amount of relatively large thermoplastic particles with a minor amount of relatively small thermoplastic particles on a forming surface, the temperature of heating, the time of heating, and the amount of plastisol being sufficient to fuse the small particles into a continuous layer on the forming surface and sufficient to fuse only portions of the larger particles into a continuous layer. The relative amounts of large and small particles are such that the smaller particles fuse into a backing layer which holds the larger particles together. The temperature and time of fusion is insufficient to fuse the larger particles into a smooth layer as the larger particles remain substantially in particulate form. The time and temperature treatment will cause only portions of the outer surfaces of the particles to fuse into the continuous layer of smaller particles.

The relative size of the large particles to the small particles is generally in the range of 6.5:1 to 200:1, preferably from 20:1 to 50:1.

The size of the large particles is less than 500 microns, preferably in the range of 10 to 100 microns.

The size of the small particles can vary depending on the size of the larger particles, but is preferably in the range of 0.5 to 1.5 microns.

As used throughout this specification, particle size means the average diameter of the particles as determined by screen tests.

The weight ratio of relatively large particles to relatively small particles is generally greater than 2:1, preferably in the range of 7:3 to 9:1. For each 100 parts of thermoplastic polymer material mixture to form the film, there will be preferably 10 to 30 parts by weight of smaller particles and 70 to 90 parts by weight of larger particles.

The amount of plasticizer will vary depending on the desired final hardness of the product. The amount of plasticizer, however, will be insufficient to substantially fuse the larger particles into a smooth, continuous surface. Generally, the amount of plasticizer will vary between 40 to 100 weight parts of plasticizer per 100 weight parts of total thermoplastic particles.

The types of plasticizers will depend on the type of thermoplastic particles. Suitable plasticizers include those listed on pages 358–379 of Modern Plastic Encyclopedia, 1965 edition, volume 42, number 1A.

The film can be formed by various methods. One such method is to mix together the large and small particles in the plasticizer and deposit the plastisol on a flat surface.

The thus deposited film is passed into an oven wherein it is heated to a temperature for a time sufficient to fuse only the smaller particles into the continuous layer. The thus fused film can then be cooled and peeled from the forming surface.

Alternately, the above process can be carried out by depositing the plastisol on a fabric or metal surface so that the final particle is an adherent layer of a synthetic material with a suede-like finish.

The time and temperature will vary depending on the type of thermoplastic polymer, and amount of plasticizer used. Generally, for polyvinyl chloride, for example, the temperature will be below 350° F. and generally be in the range of 250° to 350° F. The time of heating will generally be in the range of 1 minute to 2 hours, depending on the temperature. Preferably, the plastisol is cured for 5 to 15 minutes at a temperature in the range of 325° to 350° F.

As a still further alternate method of making the novel film according to the invention, a heated metal part can be dipped into a liquid plastisol containing the proper mixture of large and small thermoplastic particles before passing the metal part to an oven where the plastisol is cured. Other methods of forming the film are by spraying or brushing the plastisol onto an article to be coated.

EXAMPLE 1

20 parts of Exon 654 [1] resin are mixed with 80 parts of Tenneco #250–12 [2] resin. The mixture is dispersed into about 80 parts of Eastman DOP [3] plasticizer. The thus formed plasticisol is deposited on a metal surface, in a coating of about 1/16 of an inch thick. Prior to coating, the metal surface is primed with a thermoplastic-thermosetting epoxy-resin. The metal part was put into an oven at 330° for about 10 minutes. The part is removed and cooled. The part has an adherent coating of a polyvinyl chloride, whose surface is rough and resembles that of suede. On brushing the surface, no particles are removed.

EXAMPLE 2

The above plastisol was deposited onto a Teflon coated surface and given the same heat treatment for the same time as disclosed in Example 1. At the end of the heat treating time, the film was removed and cooled. The polyvinyl chloride layer was then peeled from the Teflon coated surface. The resulting film had a continuous bottom surface and a suede-like outer surface.

Various fillers such as calcium carbonate can be employed, depending on the final product desired.

Reasonable variation and modification are possible within the scope of the foregoing disclosure, the drawings, and the appended claims of the invention without departing from the spirit thereof.

The embodiments of the invention in which an exclusive property or privilege is claimed are defined as follows.

We claim:

1. A method of forming a non-reflective, suede-like finish film from a synthetic thermoplastic polymer, comprising: mixing a first mass of synthetic thermoplastic polymer particles having an average particle size of less than 500 microns with a second mass of particles of the same polymer whose average particle size relative to that of said first mass is in the range of 1:6.5 to 1:200, and with a suitable plasticizer for said thermoplastic particles to form a plastisol, and heating said plastisol on a forming surface to a temperature and for a time sufficient to fuse substantially all particles of said second mass to form a continuous layer, while fusing only portions of said first mass particles, leaving a surface formed by first mass particles substantially in particle form protruding out of said continuous layer to form said suede-like finish film.

2. The method of claim 1 in which 70–90 parts by weight of said first mass particles are mixed with 30–10 parts by weight of said second mass particles and with 40 to 100 parts by weight of said plasticizer for every 100 parts by weight of said first and second mass particles.

3. The method of claim 2 in which said plastisol is heated on said forming surface to a temperature of 250 to 350° F. for a time of 5 to 15 minutes.

4. A method for forming a no gloss, suede-like finish film from a synthetic thermoplastic polymer comprising: heating a plastisol comprising a mixture of 70 to 90 parts by weight of a first mass of thermoplastic particles having an average size of less than 500 microns in diameter, 30 to 10 parts by weight of smaller thermoplastic particles whose average size relative to said first particles is in the range of 1:6.5 to 1:200, and 40 to 100 parts by weight of a suitable plasticizer for every 100 parts by weight of thermoplastic particles, on a forming surface to a temperature in the range of 250° to 350° F. for a time in the range of 5 to 15 minutes to fuse substantially all particles of said second mass to form a continuous layer, while fusing only portions of said first mass particles, leaving a surface formed by first mass particles substantially in particle form protruding out of said continuous layer to form said suede-like finish film.

5. The method of claim 4 in which the relative particle size of said second mass particles to said first mass particles is in the range of 1:20 to 1:50.

6. The method of claim 4 in which the size of said first mass particles is in the range of 10 to 100 microns.

7. The method of claim 6 in which the relative particle size of said second mass particles to said first mass particles is in the range of 1:20 to 1:50.

8. The method of claim 7 in which said second mass particles have an average size in the range of .5 to 1.5 microns.

References Cited

UNITED STATES PATENTS

| | | | |
|---|---|---|---|
| 2,371,868 | 3/1945 | Berg et al. | 264—126 |
| 3,078,510 | 2/1963 | Rowe | 264—122 |
| 3,194,856 | 7/1965 | Palmer | 264—122 |
| 3,359,352 | 12/1967 | Powell et al. | 264—126 |
| 3,414,642 | 12/1968 | Baum | 264—126 |

ROBERT F. WHITE, Primary Examiner

J. R. HALL, Assistant Examiner

U.S. Cl. X.R.

264—122, 126

---

[1] A polyvinyl chloride resin having an average particle size between 0.5 and 1.5 microns, sold by Firestone Tire and Rubber Co.
[2] A polyvinyl chloride resin having an average particle size between 10 and 100 microns, sold by Tenneco, Inc.
[3] A dioctyl phthalate plasticizer sold by Eastman Chemical Products, Inc.